US009746622B2

(12) United States Patent
Ladouceur et al.

(10) Patent No.: US 9,746,622 B2
(45) Date of Patent: Aug. 29, 2017

(54) OPTICAL COUPLING WITH A REWRITABLE PHOTOREFRACTIVE POLYMER LAYER

(71) Applicant: Empire Technology Development LLC, Wilmington, DE (US)

(72) Inventors: Francois Ladouceur, Waterloo (CA); Michael John Nicholls, Freemans Reach (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/778,601

(22) PCT Filed: Apr. 24, 2014

(86) PCT No.: PCT/US2014/035353
§ 371 (c)(1),
(2) Date: Sep. 20, 2015

(87) PCT Pub. No.: WO2015/163896
PCT Pub. Date: Oct. 29, 2015

(65) Prior Publication Data
US 2016/0154192 A1    Jun. 2, 2016

(51) Int. Cl.
*G02B 6/42*    (2006.01)
*G02B 6/30*    (2006.01)
(Continued)

(52) U.S. Cl.
CPC ........... *G02B 6/4212* (2013.01); *G02B 6/138* (2013.01); *G02B 6/262* (2013.01); *G02B 6/30* (2013.01);
(Continued)

(58) Field of Classification Search
CPC .... G02B 6/4212; G02B 6/262; G02B 6/3895; G02B 6/382; G02B 6/30; G02B 6/4292; G02B 6/4227; G02F 1/0126
(Continued)

(56) References Cited

U.S. PATENT DOCUMENTS 4,056,305 A   11/1977   McCartney et al.
4,428,234 A    1/1984   Walker
(Continued)

FOREIGN PATENT DOCUMENTS

CN   101430449 A   5/2009
CN   101952794 A   1/2011
(Continued)

OTHER PUBLICATIONS

Blanche, P.-A., et al., "Holographic three-dimensional telepresence using large-area photorefractive polymer," Nature, vol. 468, pp. 80-83 (Nov. 4, 2010).
(Continued)

*Primary Examiner* — Akm Enayet Ullah
(74) *Attorney, Agent, or Firm* — Turk IP Law, LLC

(57) ABSTRACT

Technologies are generally described to communicatively couple an optical fiber to an optical element using a polymer layer. An optical fiber may be coupled to an optical element, such as an optical waveguide or another optical fiber, using a layer of rewritable photorefractive polymer positioned between the optical fiber and the optical element. Light from a light source may be applied to the optical fiber to initiate a transient photorefractive effect in the polymer layer facilitating corrections of misalignment. A path of high refractive index may be formed in the polymer layer, where the path of high refractive index communicatively couples the optical fiber to the optical element reducing alignment concerns and increasing alignment tolerances of optical elements. In some
(Continued)

examples, the path of high refractive index may be re-established by rewriting the polymer layer through another application of light from the light source if the communicative coupling is disrupted.

8 Claims, 7 Drawing Sheets

(51) Int. Cl.
G02B 6/26 (2006.01)
G02B 6/38 (2006.01)
G02B 6/138 (2006.01)
G02F 1/01 (2006.01)

(52) U.S. Cl.
CPC ............ *G02B 6/382* (2013.01); *G02B 6/3895* (2013.01); *G02B 6/4227* (2013.01); *G02B 6/4292* (2013.01); *G02F 1/0126* (2013.01); *G02B 6/3885* (2013.01)

(58) Field of Classification Search
USPC ................. 385/14, 24, 33, 88, 89, 127, 134; 528/481; 359/3
See application file for complete search history.

(56) References Cited

U.S. PATENT DOCUMENTS

| | | | |
|---|---|---|---|
| 4,480,182 A | 10/1984 | Ely et al. | |
| 4,542,375 A | 9/1985 | Alles et al. | |
| 4,609,816 A | 9/1986 | Severin | |
| 4,634,858 A | 1/1987 | Gerdt et al. | |
| 4,662,962 A | 5/1987 | Malavieille | |
| 4,685,765 A | 8/1987 | Daly et al. | |
| 4,733,068 A | 3/1988 | Thiele et al. | |
| 4,886,361 A | 12/1989 | Furstenau | |
| 4,929,050 A | 5/1990 | Wilson | |
| 5,136,666 A | 8/1992 | Anderson et al. | |
| 5,142,605 A * | 8/1992 | Diemeer | G02B 6/1221 252/299.01 |
| 5,555,331 A | 9/1996 | Billet et al. | |
| 5,835,646 A * | 11/1998 | Yoshimura | G02B 6/262 385/134 |
| 6,081,632 A | 6/2000 | Yoshimura et al. | |
| 6,231,593 B1 | 5/2001 | Meserol | |
| 6,236,782 B1 | 5/2001 | Kewitsch et al. | |
| 6,278,815 B1 | 8/2001 | Poisel | |
| 6,398,778 B1 | 6/2002 | Gu et al. | |
| 6,492,980 B2 | 12/2002 | Sandbach | |
| 6,538,644 B1 | 3/2003 | Muraoka | |
| 6,763,154 B2 | 7/2004 | MacDonald et al. | |
| 6,842,545 B2 | 1/2005 | Lackritz et al. | |
| 8,526,770 B2 | 9/2013 | Casasanta | |
| 2002/0181908 A1 | 12/2002 | Pedersen et al. | |
| 2002/0186945 A1* | 12/2002 | Szkopek | G02B 6/03688 385/127 |
| 2002/0196995 A1 | 12/2002 | Kersey et al. | |
| 2003/0026554 A1* | 2/2003 | Jin | G02B 6/4249 385/89 |
| 2004/0067005 A1 | 4/2004 | Miyazawa et al. | |
| 2004/0242841 A1* | 12/2004 | Cammack | C08F 6/00 528/481 |
| 2005/0017383 A1 | 1/2005 | Shimizu et al. | |
| 2005/0052714 A1* | 3/2005 | Klug | G03H 1/22 359/3 |
| 2005/0058910 A1* | 3/2005 | Takizawa | G03F 7/001 430/1 |
| 2005/0201681 A1 | 9/2005 | Payne | |
| 2005/0259991 A1* | 11/2005 | Dudelzak | G01S 3/782 398/118 |
| 2005/0286835 A1 | 12/2005 | Maxey | |
| 2006/0001653 A1 | 1/2006 | Smits | |
| 2006/0023988 A1 | 2/2006 | Kurtz et al. | |
| 2007/0235297 A1 | 10/2007 | Stoschek et al. | |
| 2010/0156848 A1 | 6/2010 | Yatsuda et al. | |
| 2011/0102705 A1 | 5/2011 | Miyazaki et al. | |
| 2011/0114856 A1 | 5/2011 | Cooke | |
| 2012/0288227 A1 | 11/2012 | Kim et al. | |
| 2012/0315485 A1 | 12/2012 | Iwazumi et al. | |
| 2013/0089289 A1* | 4/2013 | Sorin | G02B 6/32 385/33 |

FOREIGN PATENT DOCUMENTS

| | | | |
|---|---|---|---|
| EP | 1315006 A1 | 5/2003 | |
| EP | 2254030 A1 | 11/2010 | |
| JP | 5621279 A | 2/1981 | |
| JP | 2001147772 A | 5/2001 | |
| WO | 2006081633 A1 | 8/2006 | |
| WO | 2007128039 A1 | 11/2007 | |
| WO | 2009113330 A1 | 9/2009 | |

OTHER PUBLICATIONS

Christenson, C.W., et al., "Complementary grating dynamics in photorefractive polymers with Alq3," SPIE Proceedings, vol. 7599, pp. 4 (Mar. 1, 2010).

Eralp, M., et al., "Variation of Bragg condition in low-glass-transition photorefractive polymers when recorded in reflection geometry," Opt Express, vol. 15, No. 18, pp. 11622-11628 (Sep. 3, 2007).

Filas, R.W., et al., "Index-matching elastomers for fiber optics," IEEE Transactions on Components, Hybrids, and Manufacturing Technology, vol. 13, No. 1, pp. 133-136 (Mar. 1990).

International search report and written opinion for PCT application No. PCT/US2014/035353 mailed on Sep. 2, 2014.

Yoshimura, T., et al., "Self-Organized Lightwave Network Based on Waveguide Films for Three-Dimensional Optical Wiring Within Boxes," Journal of Lightwave Technology, vol. 22, No. 9, pp. 2091—(Sep. 2004).

"Fresnel equations," Wikipedia, accessed at http://web.archive.org/web/20140407192118/http://en.wikipedia.org/wiki/Fresnel_equations, last modified on Apr. 3, 2014, pp. 5.

"Fusion Splicing of Fibers," RP PhotonicsEncyclopedia, accessed at http://web.archive.org/web/20131018024758/http://www.rp-photonics.com/fusion_splicing_of_fibers.html, accessed on Dec. 12, 2016, pp. 3.

"Fusion splicing," Wikipedia, accessed at http://web.archive.org/web/20140228214518/http://en.wikipedia.org/wiki/Fusion_splicing, last modified on Feb. 13, 2014, pp. 2.

Astin, A.D., "Finger force capability: measurement and prediction using anthropometric and myoelectric measures," Thesis submitted to the Faculty of the Virginia Polytechnic Institute and State University, pp. 1-103 (Dec. 16, 1999).

Fuks-Janczarek, I., et al., "Large photoelastic effect in modified fullerenes," Journal of Modern Optics, vol. 50, Issue 8, pp. 1277-1283 (2003).

Ganesan, L.M., et al., "Piezo-optical and electro-optical behavior of nematic liquid crystals dispersed in a ferroelectric copolymer matrix," Journal of Physics D Applied Physics, vol. 43, No. 1, pp. 15401-15406 (2009).

Gondek, E., et al., "UV-operated pyrazoloquinoline piezooptical materials," Optical Materials, vol. 30, Issue 6, pp. 339-945 (Feb. 2008).

Hutchinson, J., and Ramli, D., "NBN Contractors Fail to Deliver," Financial Review, accessed at http://www.afr.com/business/telecommunications/nbn-contractors-fail-to-deliver-20130401-j0yr1, Apr. 2, 2013, pp. 5.

International Search Report and Written Opinion for International Application No. PCT/US2012/023124, mailed on Mar. 16, 2012, pp. 8.

International Search Report and Written Opinion for International Application No. PCT/US2014/012042, mailed on May 8, 2014, pp. 10.

(56) References Cited

OTHER PUBLICATIONS

Kityk, I.V., et al., "Photoinduced effects in γ-glycine nanocrystallites embedded in polymer matrices," Optics Communications, vol. 284, pp. 1575-1577 (2011).

Nørstebø, C.A., "Intelligent Textiles, Soft Products," pp. 1-14 (2007).

Qiu, X., "Patterned piezo-, pyro-, and ferroelectricity of poled polymer electrets," Journal of Applied Physics, vol. 108, No. 1, pp. 011101-1-011101-19 (2010).

Sandrock, M., et al. "A widely tunable refractive index in a nanolayered photonic material," Applied Physics Letters, vol. 84, No. 18, pp. 3621-3623 (May 3, 2004).

Tkaczyk, S., et al., UV-excited piezo-optical effects in oxide nanocrystals incorporated into PMMA matrices, Acta Materialia, vol. 56, pp. 5677-5684 (2008).

\* cited by examiner

COMPUTER PROGRAM PRODUCT 700

SIGNAL BEARING MEDIUM 702

704 ONE OR MORE INSTRUCTIONS TO
APPLY LIGHT FROM A LIGHT SOURCE TO AN OPTICAL FIBER TO INITIATE A PHOTOREFRACTIVE EFFECT IN A POLYMER LAYER LOCATED BETWEEN THE OPTICAL FIBER AND AN OPTICAL ELEMENT;
FORM A PATH OF HIGH REFRACTIVE INDEX IN THE POLYMER LAYER THROUGH THE PHOTOREFRACTIVE EFFECT TO PROVIDE A COMMUNICATIVE COUPLING BETWEEN THE OPTICAL ELEMENT AND THE OPTICAL FIBER;
CAUSE THE PATH OF HIGH REFRACTIVE INDEX TO DISSIPATE IN THE POLYMER LAYER BY TERMINATING THE LIGHT FROM THE LIGHT SOURCE; AND
RE-ESTABLISH THE PATH OF HIGH REFRACTIVE INDEX IN THE POLYMER LAYER BY REWRITING THE POLYMER LAYER THROUGH ANOTHER APPLICATION OF THE LIGHT FROM THE LIGHT SOURCE IN RESPONSE TO DETERMINATION THAT THE COMMUNICATIVE COUPLING BETWEEN THE OPTICAL FIBER AND THE OPTICAL ELEMENT IS DISRUPTED.

| COMPUTER-READABLE MEDIUM 706 | RECORDABLE MEDIUM 708 | COMMUNICATIONS MEDIUM 710 |

FIG. 7

OPTICAL COUPLING WITH A REWRITABLE PHOTOREFRACTIVE POLYMER LAYER

CROSS-REFERENCE TO RELATED APPLICATION

This Application is the U.S. National Stage filing under 35 U.S.C. §371 of PCT Application Ser. No. PCT/US14/35353 filed on Apr. 24, 2014. The PCT Application is herein incorporated by reference in its entirety.

BACKGROUND

Unless otherwise indicated herein, the materials described in this section are not prior art to the claims in this application and are not admitted to be prior art by inclusion in this section.

Coupling optical fibers to optical elements, such as optical waveguides or other optical fibers, may require a high degree of accuracy in alignment, both for multimode optical fibers and even more so for single mode optical fibers and optical waveguides. Aligning a single mode optical fiber may be achievable during the manufacturing process, however, lower tolerance of the single mode optical fiber may result in a higher cost of manufacture and a greater degree of difficulty for alignment in the field. Aligning multiple single mode optical fibers, such as in an optical fiber ribbon, may be very challenging as each single mode fiber in the ribbon may have its own inaccuracies, yet all of the single mode fibers in the ribbon have to be aligned with minimum loss.

Optical fiber cable splicing, the conventional technique for optical fiber coupling performed in the field, may be labor intensive, costly, and error prone. Splicing may be defective and involve rework due to disturbed alignments in the coupling of the optical fibers. Given that a majority of the optical fibers is deployed in data centers or in the field, aligning optical fibers in the field rather than at the time of manufacture or by splicing may lead to higher yield connections at lower cost.

SUMMARY

The present disclosure generally describes techniques for communicatively coupling an optical fiber to an optical element using a rewritable polymer layer.

According to some examples, methods to communicatively couple an optical fiber to an optical element using a polymer layer are provided. An example method may include applying light from a light source to the optical fiber to initiate a photorefractive effect in the polymer layer, where the polymer layer is located between the optical fiber and the optical element. The example method may further include forming a path of high refractive index in the polymer layer through the photorefractive effect, where the path of high refractive index may provide a communicative coupling between the optical element and the optical fiber, the communicative coupling may be an optical coupling facilitating optical communication between the optical fiber and the optical element, and the polymer layer may be photorefractive.

According to other examples, apparatuses configured to form an optical coupling between an optical fiber and an optical element may be described. An example apparatus may include a connector configured to mechanically couple the optical fiber and the optical element and a polymer layer supported by the connector and configured to be located between the optical fiber and the optical element when the optical fiber and optical element are mechanically coupled by the connector. The polymer layer may include a photorefractive polymer such that a path of high refractive index is formed in the polymer layer through a photorefractive effect in response to passage of light from a light source through the polymer layer between the optical fiber and the optical element, and the path of high refractive index may communicatively couple the optical element and the optical fiber when the path of high refractive index is formed.

According to further examples, electronic devices capable of optical communication are described. An example electronic device may include a circuit board comprising an optical component and an optical receptacle, and a layer of rewritable photorefractive polymer attached to the optical receptacle. The layer of rewritable photorefractive polymer may be configured such that a path of high refractive index is formed in the layer of the polymer through a photorefractive effect in response to application of light to the layer of the polymer, where the path of high refractive index through the layer of the polymer may provide a communicative coupling to the optical component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
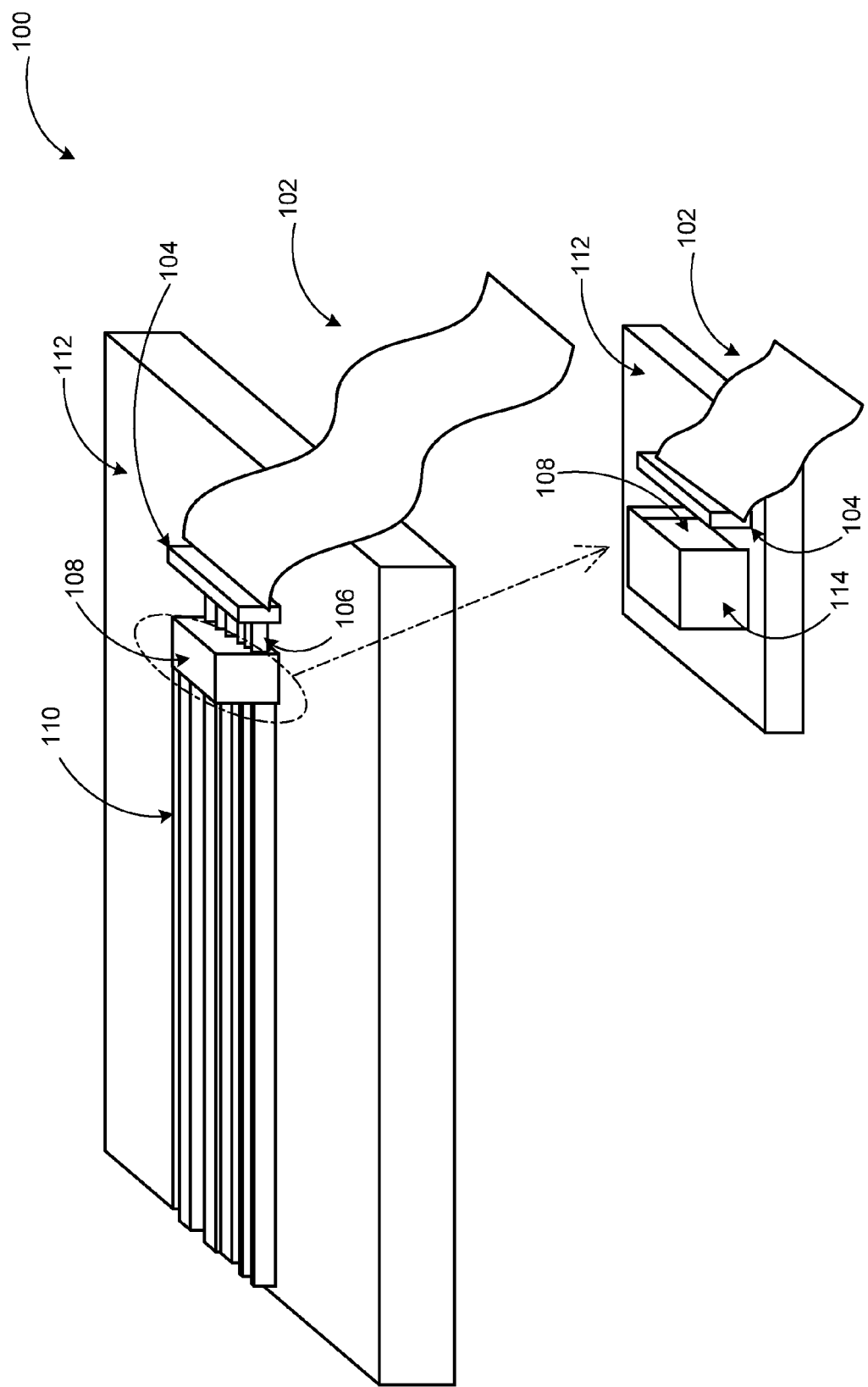
FIG. 1 illustrates an example apparatus configured to form an optical coupling between an optical fiber and an optical waveguide using a polymer layer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to communicatively coupling an optical fiber to an optical element using a rewritable polymer layer.

Briefly stated, technologies are generally described to communicatively couple an optical fiber to an optical element using a polymer layer. An optical fiber may be coupled to an optical element, such as an optical waveguide or another optical fiber, using a layer of rewritable photorefractive polymer positioned between the optical fiber and the optical element. Light from a light source may be applied to the optical fiber to initiate a photorefractive effect, such as a transient photorefractive effect, in the polymer layer facilitating corrections of misalignment. A path of high refractive index may be formed in the polymer layer, where the path of high refractive index communicatively couples the optical fiber to the optical element reducing alignment concerns and increasing alignment tolerances of optical elements. In some examples, the path of high refractive index may be re-established by rewriting the polymer layer through another application of light from the light source if the communicative coupling is disrupted.

FIG. 1 illustrates an example apparatus configured to form an optical coupling between an optical fiber and an optical waveguide using a polymer layer, arranged in accordance with at least some embodiments described herein.

As shown in a diagram 100, the example apparatus may include an optical fiber 102, a rewritable photorefractive polymer layer 108, and one or more optical waveguides 110, where the optical waveguides 110 may be arranged on a circuit board 112 or other electronic device capable of optical communication. The optical fiber 102 may be a single mode fiber or a multimode fiber. The optical fiber may further be a flat fiber such as a ribbon cable (as illustrated in the diagram 100), a stacked flat pair of fibers, a ring of fibers, a cylindrical fiber, or other configuration of one or more individual fibers. The optical fiber 102 may include a connector 104 and one or more naked fiber ends 106. The example apparatus may further include a mechanical connector and cover 114 enclosing the polymer layer 108.

The polymer layer 108 may be located between the optical fiber 102 and the one or more optical waveguides 110. The mechanical connector and surrounding cover 114 may be attached to the circuit board 112 and serve as an optical receptacle to couple the optical fiber 102, the optical waveguides 110, and the polymer layer 108. The cover may also serve to prevent light from external light sources from penetrating the polymer layer 108 and to prevent particulate ingress. The naked fiber ends 106 of the optical fiber 102 may be butt-coupled against the polymer layer 108, which may be deformable, to eliminate airspace and to eliminate a need for index matching fluid. In some embodiments, the polymer layer 108 may be deposited on the circuit board 112 by one of spin coating, drop casting, or other similar technique and may be patterned to match the optical waveguides 110. In other embodiments, the polymer layer 108 may be deposited on the optical waveguides 110 in a pattern to match the optical waveguides 110. The connector 104 of the optical fiber 102 may mechanically couple the optical fiber to the optical waveguides 110. FIG. 1 also shows an expanded view of the connector, in which the naked fiber ends 106 are not shown for illustrative clarity of polymer layer 108.

In an example embodiment, light from a light source may be applied to the optical fiber to initiate a photorefractive effect in the polymer layer. The applied light may be infrared light, visible light, or ultra-violet light. The light source may be through the optical fiber or on the circuit board. In one embodiment, a sensor positioned in the connector 104 of the optical fiber 102 may sense when the optical fiber 102 is coupled to the optical waveguides 110 through the polymer layer 108. In response to detecting that the optical fiber 102 is coupled to the optical waveguides 110, the light from the light source may be applied automatically.

The photorefractive effect is a mechanism for a modulation of refractive index of a material in response to an application of light. The mechanism may include a generation, transport, and trapping of charge through photoconduction in the regions where the light is applied, such as the polymer layer 108, to create space-charge fields between the light and dark regions. The space-charge fields may cause the modulation of the refractive index acting through electro-optic and molecular orientation effects.

For example, the applied light from the light source may generate mobile charges, which may be usually positively charged holes in the polymer layer 108, through the photoionization of sensitizers or photo-charge generation agents. The positively charged holes may migrate due to an applied electric field separating the positive from the negative charges by the charge-transfer photo-conducting properties of the polymer layer 108. The negative charges may generally remain localized. The positively charged holes may then be trapped at suitable charge trapping sites. The trapped charges may establish charge density gradients in the polymer layer 108 that produce a space-charge electric field. The space-charge field created between the dark and light regions may then modulate the refractive index of the polymer layer 108 via the electro-optic effect and reorientation of the molecular dipoles in the space-charge field.

Through the photorefractive effect, a path of high refractive index may be formed in the polymer layer 108, where the path of high refractive index communicatively couples the optical fiber 102 to the optical waveguides 110. This path may form (rapidly or gradually) through the self-written properties of photorefractive materials which continuously reinforce more likely paths at the expense of less likely ones. The communicative coupling may be an optical coupling facilitating optical communication between the optical fiber and the optical waveguides 110. Due to transient photorefractive properties of the polymer layer 108, upon termination of the light from the light source, the path of high refractive index may dissipate in the polymer layer 108 enabling the polymer layer 108 to return to its initial state. The transient photorefractive properties may directly enable some functionalities as discussed in the next paragraph.

In response to a determination that a communicative coupling between the optical fiber 102 and the optical waveguides 110 is disrupted, another application of light from the light source may be applied to rewrite the polymer layer 108 to re-establish the path of high refractive index. The re-established path of high refractive index may again provide communicative coupling to the optical fiber 102 and the optical waveguides 110. In one embodiment, a sensor positioned in the connector 104 of the optical fiber 102 may sense when the communicative coupling between the optical fiber 102 and the optical waveguides 110 through the polymer layer 108 is disrupted. In response to the sensation, the other application of light from the light source may be applied automatically to rewrite the polymer layer 108 to re-establish the path of high refractive index. In another embodiment, the other application of light from the light source may be applied to rewrite the polymer layer 108 to re-establish the path of high refractive index at intervals to provide regular communicative coupling between the optical fiber 102 and the one or more optical waveguides 110.

Figure 2:
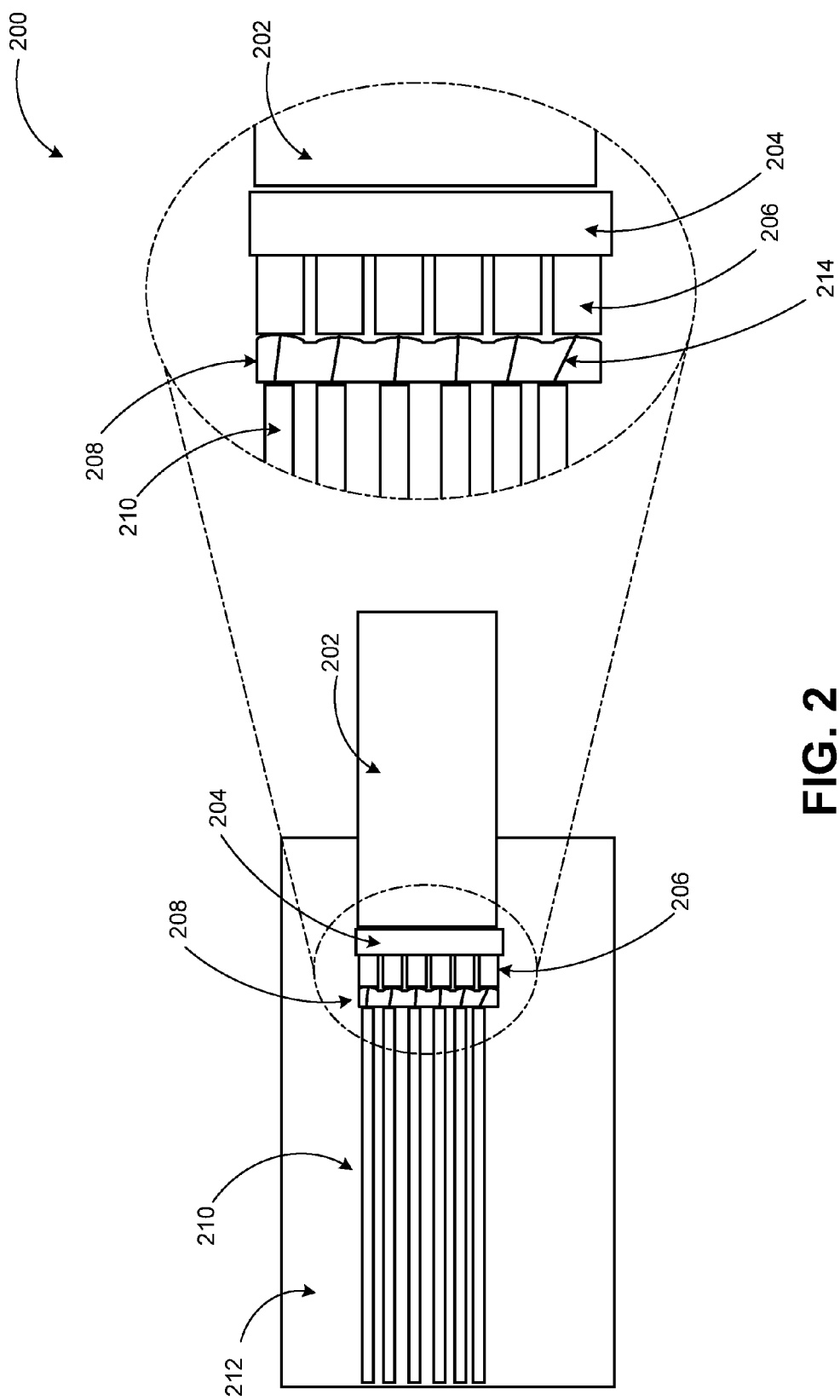
FIG. 2 illustrates an example configuration of an optical fiber optically coupled to an optical waveguide.

FIG. 2 illustrates an example configuration of an optical fiber optically coupled to an optical waveguide, arranged in accordance with at least some embodiments described herein.

As shown in a diagram 200, the example configuration may include an optical fiber 202, where the optical fiber 202 includes a connector 204 and one or more naked fiber ends 206. The connector 204 of the optical fiber 202 may mechanically couple the optical fiber 202 to one or more optical waveguides 210. A path of high refractive index 214 formed in a rewritable photorefractive polymer layer 208 may communicatively couple the optical fiber 202 to the optical waveguides 210. As mentioned previously in FIG. 1, the optical waveguides 210 may be arranged on a circuit board 212 or other electronic device capable of optical communication.

The optical fiber 202 may be a single mode fiber or a multimode fiber. The optical fiber may further be a flat fiber such as a ribbon cable, a stacked flat pair of fibers, a ring of fibers, a cylindrical fiber, or other configuration of one or more individual fibers. The polymer layer 208 may comprise and/or be composed of an elastomer, such as a thermoplastic polyurethane elastomer or a polysiloxane such as poly (dimethyl-siloxane). The polymer layer 208 may also be composed of a polymer matrix, such as poly(acrylic tetraphenyldiaminobiphenol) or poly(n-butylamino thionylphosphazene). The polymer layer 208 may further include a photorefractive additive, such as 4-homopiperidinobenzylidenemalononitrile, an electron trapping agent, such as tris(8-hydroxyquinolinato)aluminum, and/or a photo-resistive material. Other polymers and/or materials may be used to compose the polymer layer 208 if together they combine functionalities to exhibit photorefractive properties enabling initiation of a photorefractive effect. For example, to exhibit photorefractive properties, the other polymers and/or materials combined may transport either positive or negative charges, trap transported charges, and have a field-induced refractive index modulation mechanism. These functionalities may be incorporated into a polymer through techniques such as organic doping of the polymer or monomer functionalization prior to polymerization to form the polymer layer 208. A composition for the polymer layer 208 may be selected to achieve a predetermined decay time of the path of high refractive index 214. A thickness of the polymer layer 208 may be in a range of about 10 to about 200 μm, for example, where the lower bound may be given by (for example, approximately equal to) a diameter of the core of the optical waveguides 210. The thickness range is provided as example only and depending on materials, implementation, and other factors, the polymer layer 208 may have any thickness.

The polymer layer 208 may be deposited on the circuit board 212 by spin coating, drop coating, or other similar techniques and may be patterned to match the optical waveguides 210. In other embodiments, the polymer layer may be deposited directly onto the optical waveguides 210 in a pattern to match the optical waveguides 210. The naked fiber ends 206 of the optical fiber may be butt-coupled to the polymer layer 208, which is deformable due to elastomeric properties, eliminating air space and reducing the need for index matching fluid.

Once light is applied from a light source through the optical fiber 202 to initiate the photorefractive effect in the polymer layer 208 located between the optical fiber 202 and the optical waveguides 210, the path of high refractive index 214 may be formed in the polymer layer 208. The path of high refractive index 214 may communicatively couple the optical fiber 202 and the optical waveguides 210 through the polymer layer 208. The communicative coupling may be optical coupling to facilitate optical communication between the optical fiber and the optical waveguides. Due to the transient photorefractive properties of the polymer layer 208, once the light is terminated from the light source, the path of high refractive index 214 may dissipate and the polymer layer 208 may return to its initial state.

In response to a determination that the communicative coupling between the optical fiber 202 and the optical waveguides 210 is disrupted, another application of light may be applied from the light source to re-establish the path of high refractive index by rewriting the polymer layer 208. The re-established path of high refractive index may again provide communicative coupling to the optical fiber 202 and the optical waveguides 210. In another embodiment, the polymer layer 208 may be rewritten at intervals to provide regular communicative coupling between the optical fiber 202 and the optical waveguides 210. By providing regular communicative coupling, communicative coupling loss caused by technicians disturbing optical fibers in the field may be reduced.

Figure 3:
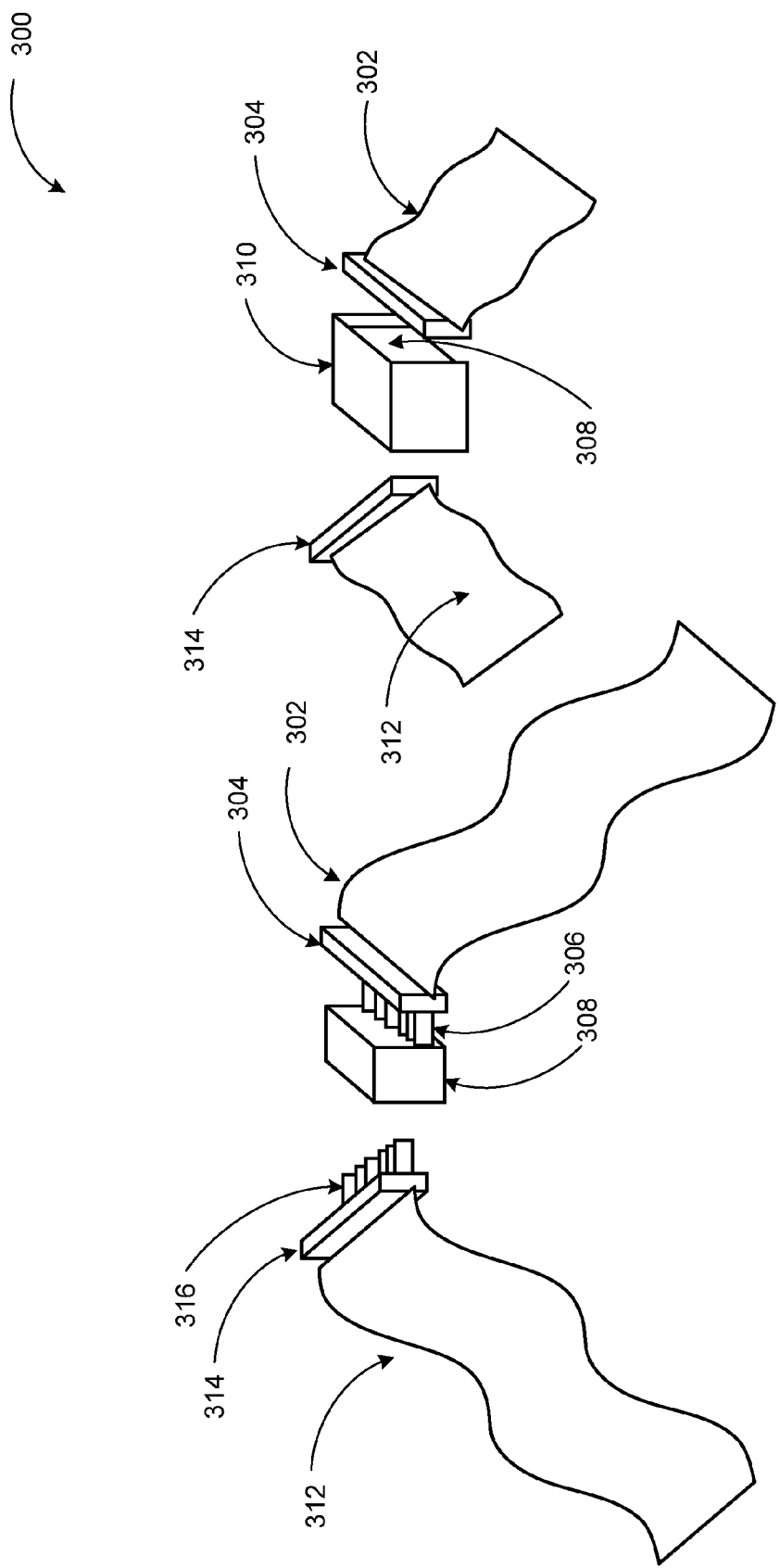
FIG. 3 illustrates an example apparatus configures to form an optical coupling between an optical fiber and another optical fiber using a polymer layer.

FIG. 3 illustrates an example apparatus configured to form an optical coupling between an optical fiber and another optical fiber using a polymer layer, arranged in accordance with at least some embodiments described herein.

As shown in a diagram 300, the example apparatus may include an optical fiber 302, where the optical fiber includes a connector 304 and one or more naked fiber ends 306, a rewritable photorefractive polymer layer 308, and another optical fiber 312. The other optical fiber 312 may also include a connector 314 and one or more naked fiber ends 316. The optical fiber 302 and the other optical fiber 312 may be a single mode fiber or a multimode fiber. The optical fiber may further be a flat fiber such as a ribbon cable, a stacked flat pair of fibers, a ring of fibers, a cylindrical fiber, or other configuration of one or more individual fibers. The example apparatus may further include a mechanical connector and surrounding cover 310 that encloses the polymer layer 308.

The polymer layer 308 may be located between the optical fiber 302 and the other optical fiber 312. The mechanical connector and surrounding cover 310 may serve as an optical receptacle coupling the optical fiber 302, the other optical fiber 312, and the polymer layer 308. The surrounding cover may also prevent light from external light sources from penetrating the polymer layer 308 and prevent particulate ingress. The naked fiber ends 306 of the optical fiber 302 and the naked fiber ends 316 of the other optical fiber 312 may be butt-coupled against the polymer layer 308, which may be deformable, to eliminate airspace and eliminate the need for index matching fluid. The connector 304 of the optical fiber 302 may mechanically couple the optical fiber to the other optical fiber 312 through the connector 314 of the other optical fiber 312.

Light from a light source may be applied to the optical fiber to initiate a photorefractive effect, as described in detail in FIG. 1, in the polymer layer 308. The applied light may be infrared light, visible light, or ultra-violet light. In one embodiment, a sensor positioned in the connector 304 of the optical fiber 302 may sense when the optical fiber 302 is coupled to the other optical fiber 312 through the polymer layer 308. In response to the sensation that the optical fiber 302 is coupled to the other optical fiber 312, the light from the light source may be applied automatically.

Through the photorefractive effect, a path of high refractive index may be formed in the polymer layer 308, where the path of high refractive index communicatively couples the optical fiber 302 to the other optical fiber 312. The communicative coupling may be an optical coupling to facilitate optical communication between the optical fiber 302 and the other optical fiber 312. In some examples, due to transient photorefractive properties of the polymer layer 308, upon termination of the light from the light source the path of high refractive index may dissipate in the polymer layer 308 and the polymer layer 308 may return to its initial state.

In response to a determination that the communicative coupling between the optical fiber 302 and the other optical fiber 312 is disrupted, another application of light from the light source may be applied to rewrite the polymer layer 308 to re-establish the path of high refractive index. The re-established path of high refractive index may again provide communicative coupling to the optical fiber 302 and the other optical fiber 312. In one embodiment, a sensor positioned in the connector 304 of the optical fiber 302 may sense when the communicative coupling between the optical fiber 302 and the other optical fiber 312 is disrupted. In response to the sensation, the other application of light from the light source may be applied automatically to rewrite the polymer layer 308 to re-establish the path of high refractive index. In another embodiment, the other application of light from the light source may be applied to rewrite the polymer layer 308 to re-establish the path of high refractive index at intervals to provide regular communicative coupling between the optical fiber 102 and the other optical fiber 312.

The above described embodiments to form optical coupling between an optical fiber and another optical fiber using a rewritable photorefractive polymer layer may replace a current field technique of optical fiber splicing. Optical fiber splicing is a field technique that is labor intensive, costly, and difficult to achieve in the field when aligning multiple pairs of optical fibers.

Figure 4:
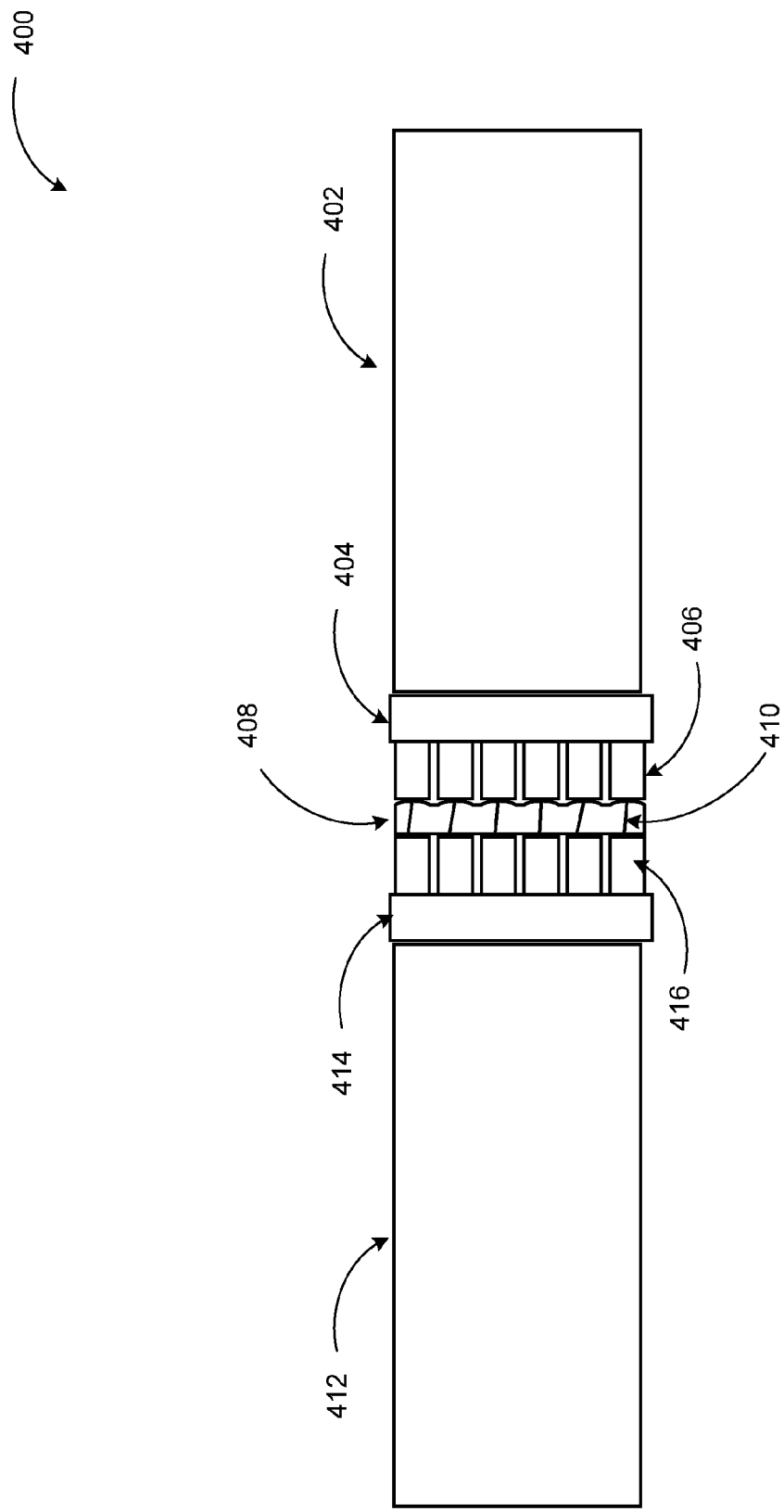
FIG. 4 illustrates an example configuration of an optical fiber optically coupled to another optical fiber.

FIG. 4 illustrates an example configuration of an optical fiber optically coupled to another optical fiber, arranged in accordance with at least some embodiments described herein.

As shown in a diagram 400, the example configuration may include an optical fiber 402, where the optical fiber includes a connector 404 and one or more naked fiber ends 406. The connector 404 may mechanically couple the optical fiber 402 to another other optical fiber 412 through a connector 414 of the other optical fiber 412. The optical fiber 402 and the other optical fiber 412 may be a single mode fiber or a multimode fiber. The optical fiber may further be a flat fiber such as a ribbon cable, a stacked flat pair of fibers, a ring of fibers, a cylindrical fiber, or other configuration of one or more individual fibers. A path of high refractive index 410 formed in a rewritable photorefractive polymer layer 408 may communicatively couple the optical fiber 402 to the other optical fiber 412. The other optical fiber 412 may also include one or more naked fiber ends 416.

The optical fiber 402 and the other optical fiber 412 may be a single mode fiber or a multimode fiber. The optical fiber 402 and the other optical fiber 412 may further be a flat fiber, a stacked flat pair of fibers, a ring of fibers, a cylindrical fiber, or other similar orientation of fiber. As discussed previously in FIG. 2, the polymer layer 408 may be composed of an elastomer, such as a thermoplastic polyurethane elastomer or poly(dimethyl-siloxane). The polymer layer 408 may also be composed of a polymer matrix, such as poly(acrylic tetraphenyldiaminobiphenol) or poly(n-butylamino thionylphosphazene). A composition of the polymer layer 408 may further include a photorefractive additive, such as 4-homopiperidinobenzylidenemalononitrile, an electron trapping agent, such as tris(8-hydroxyquinolinato) aluminum, and/or a photo-resistive material. Other polymers and/or materials may be used to compose the polymer layer 408 if together they combine at least three functionalities to exhibit photorefractive properties enabling initiation of a photorefractive effect. For example, to exhibit photorefractive properties, the other polymers and/or materials may transport either positive or negative charges, trap transported charges, and have a field-induced refractive index modulation mechanism. A composition for the polymer layer 408 may be selected to achieve a predetermined decay time of the path of high refractive index 410. A thickness of the polymer layer 408 may be in a range of about 10 to about 200 μm, for example, where the lower bound may be given by a diameter of the core of the optical fiber 402 and a diameter of the core of the optical fiber 412. The thickness range is provided as example only and depending on materials, implementation, and other factors, the polymer layer 208 may have any thickness.

The naked fiber ends 406 of the optical fiber 402 and the naked fiber ends 416 of the other optical fiber 412 may be butt-coupled to the polymer layer 408, which is deformable due to elastomeric properties, eliminating air space and reducing the need for index matching fluid. Once light is applied from a light source through the optical fiber 402 to initiate the photorefractive effect in the polymer layer 408 located between the optical fiber 402 and the other optical fiber 412, the path of high refractive index 410 may be formed in the polymer layer 408. The path of high refractive index 410 may communicatively couple the optical fiber 402 and the other optical fiber 412. The communicative coupling may be an optical coupling facilitating optical communication between the optical fiber 402 and the other optical fiber 412. In some examples, due to the transient photorefractive properties of the polymer layer 408, once the light is terminated from the light source the path of high refractive index 410 may dissipate and the polymer layer 408 may return to its initial state.

In response to a determination that the communicative coupling between the optical fiber 402 and the other optical fiber 412 is disrupted, another application of light may be applied from the light source to re-establish the path of high refractive index by rewriting the polymer layer 408. The re-established path of high refractive index may again provide communicative coupling to the optical fiber 402 and the other optical fiber 412. In another embodiment, the polymer layer 408 may be rewritten at intervals to provide regular communicative coupling between the optical fiber 402 and the other optical fiber 412. By providing regular communicative coupling, communicative coupling loss caused by technicians disturbing optical fibers in the field may be reduced.

The examples in FIGS. 1 through 4 have been described using specific apparatuses and configurations to form an optical coupling between an optical fiber and an optical element, such as the one or more optical waveguides or the other optical fiber. Embodiments to form an optical coupling between an optical fiber and an optical element are not limited to the specific apparatuses and configurations according to these examples.

Figure 5:
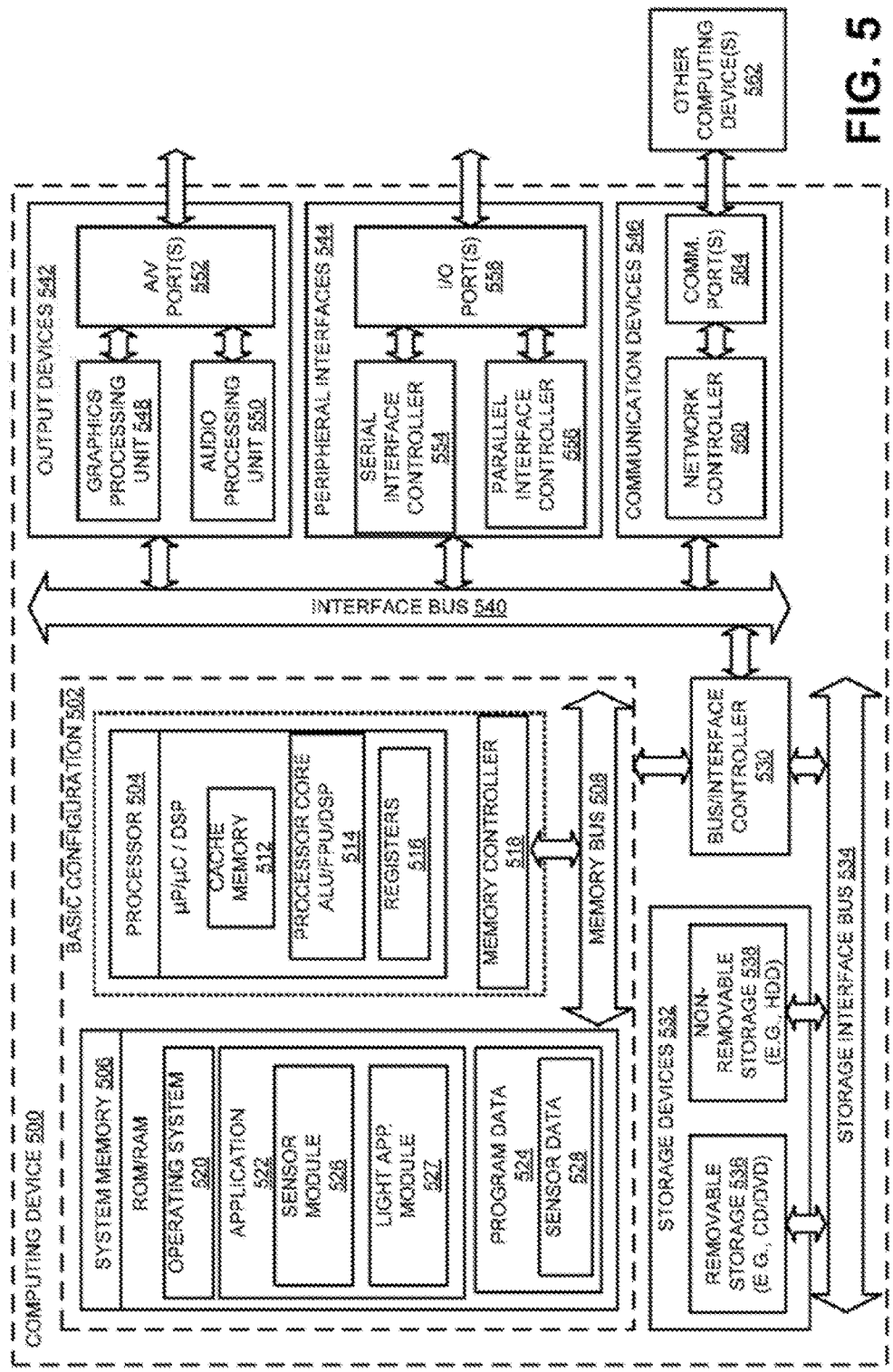
FIG. 5 illustrates a general purpose computing device, which may be used to communicatively couple an optical fiber to an optical element using a polymer layer.

FIG. 5 illustrates a general purpose computing device, which may be used to communicatively couple an optical fiber to an optical element using a polymer layer, arranged in accordance with at least some embodiments described herein.

For example, the computing device 500 may be used as a server, desktop computer, portable computer, smart phone, special purpose computer, or similar device such as a controller, a new component, a cluster of existing components in an operational system including a vehicle and a smart dwelling. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one or more levels of caching, such as a cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include a sensor module 526 and a light application module 527, which may be an integral part of the application or a separate application on its own. The sensor module 526, positioned within a connector of the optical fiber, may sense when an optical fiber and an optical element, such as an optical waveguide or another optical fiber, are coupled using a rewritable photorefractive polymer layer. In response to a determination that the optical fiber and the optical element are coupled, the light application module 527 may automatically apply light from a light source to the optical fiber. The applied light may initiate a photorefractive effect in the polymer layer, forming a path of high refractive index that communicatively couples the optical fiber to the optical element. In another embodiment, the sensor module 526 may sense when the communicative coupling between the optical fiber and the optical element is disrupted. In response to a determination that the communicative coupling between the optical fiber and the optical element is disrupted, the light application module 527 may automatically apply another application of light from a light source to the optical fiber to re-establish the path of high refractive index in the polymer layer. The program data 524 may include, among other data, sensor data 528 related to sensation that the optical fiber and the optical element are coupled and/or that the communicative coupling between the optical fiber and the optical element is disrupted, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives (SSD), or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to communicatively couple an optical fiber to an optical element using a polymer layer. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
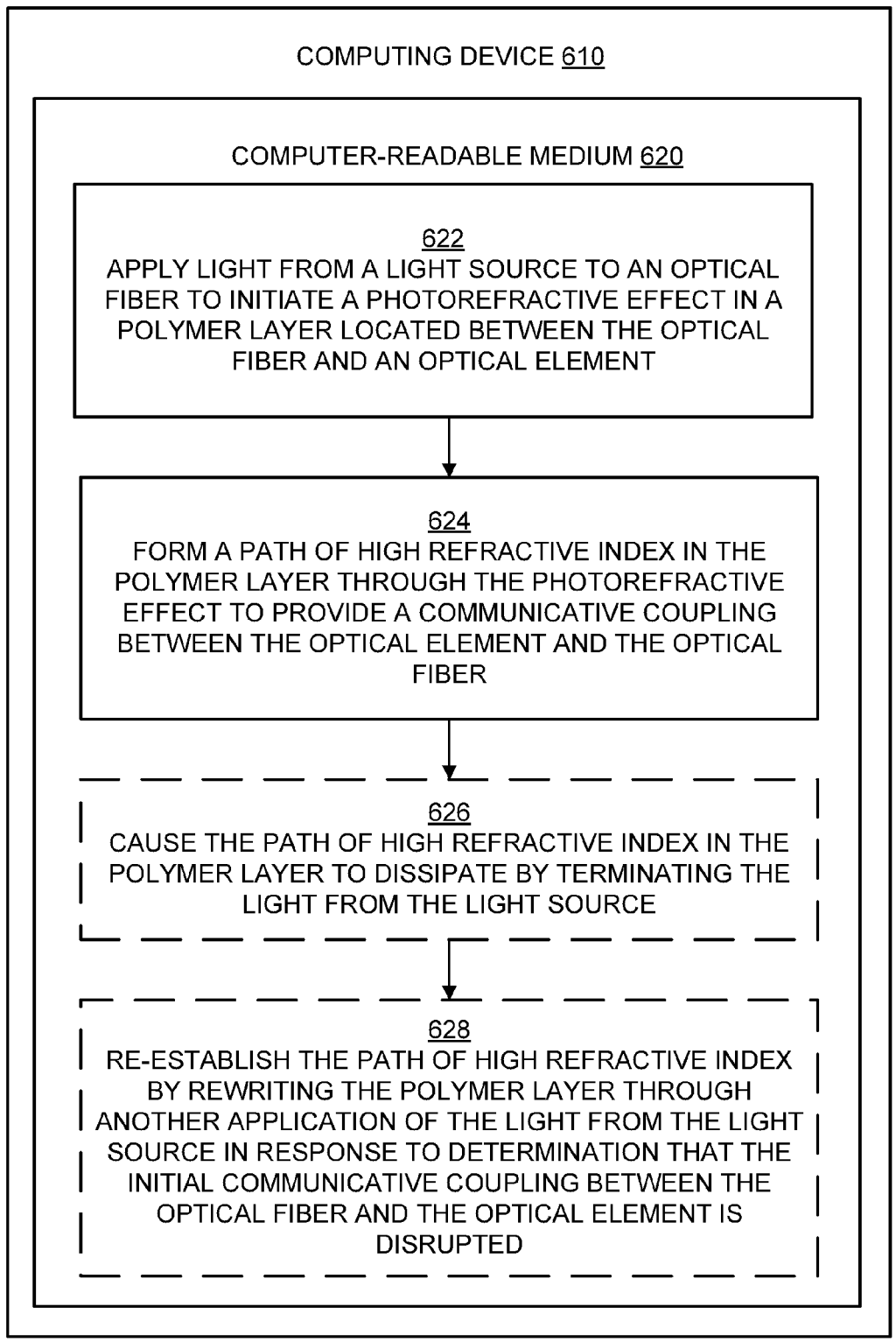
FIG. 6 is a flow diagram illustrating an example method to communicatively couple an optical fiber to an optical element using a polymer layer that may be performed by a computing device such as the computing device in FIG. 5.

FIG. 6 is a flow diagram illustrating an example method to communicatively couple an optical fiber to an optical element using a polymer layer that may be performed by a computing device such as the computing device in FIG. 5, arranged in accordance with at least some embodiments described herein.

Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process to communicatively couple an optical fiber to an optical element using a rewritable photorefractive polymer layer may begin with block 622, "APPLY LIGHT FROM A LIGHT SOURCE TO AN OPTICAL FIBER TO INITIATE A PHOTOREFRACTIVE EFFECT IN A POLYMER LAYER LOCATED BETWEEN THE OPTICAL FIBER AND AN OPTICAL ELEMENT," where light may be applied from a light source through the optical fiber or a light source on a circuit board. The light applied may be visible light, infrared light, or ultra-violet light. The polymer layer located between the optical fiber and the optical element may have photorefractive properties, enabling initiation of the photorefractive effect. The optical element may include one or more optical waveguides or another optical fiber, for example. In one embodiment, a sensor positioned in a connector of the optical fiber may sense the coupling of the optical fiber to the optical element through the polymer layer. In response to the sensation, the light from the light source may be automatically applied to the optical fiber.

Block 622 may be followed by block 624, "FORM A PATH OF HIGH REFRACTIVE INDEX IN THE POLYMER LAYER THROUGH THE PHOTOREFRACTIVE EFFECT TO PROVIDE A COMMUNICATIVE COUPLING BETWEEN THE OPTICAL ELEMENT AND THE OPTICAL FIBER," where the photorefractive effect may form a path of high refractive index in the polymer layer. The path of high refractive index may communicatively couple the optical fiber to the optical element, such as the optical waveguides or the other optical fiber, through the polymer layer. The communicative coupling may be an optical coupling to facilitate communication between the optical fiber and the optical element.

Block 624 may be followed by block 626, "CAUSE THE PATH OF HIGH REFRACTIVE INDEX TO DISSIPATE IN THE POLYMER LAYER BY TERMINATING THE LIGHT FROM THE LIGHT SOURCE," where transient photorefractive properties of the polymer layer cause the path of high refractive index to dissipate upon termination of the light from the light source. Dissipation of the path of high refractive index may enable the polymer layer to return to its initial state.

Block 626 may be followed by block 628, "RE-ESTABLISH THE PATH OF HIGH REFRACTIVE INDEX IN THE POLYMER LAYER BY REWRITING THE POLYMER LAYER THROUGH ANOTHER APPLICATION OF THE LIGHT FROM THE LIGHT SOURCE IN RESPONSE TO DETERMINATION THAT THE COMMUNICATIVE COUPLING BETWEEN THE OPTICAL FIBER AND THE OPTICAL ELEMENT IS DISRUPTED," where another application of light from the light source may be applied to re-establish the path of high refractive index by rewriting the polymer layer in response to a determination that the communicative coupling between the optical fiber and the optical element, such as the optical waveguides or the other optical fiber, is disrupted. The re-established path of high refractive index may again provide communicative coupling to the optical fiber and the optical element. In one embodiment, a sensor positioned in a connector of the optical fiber may sense that the communicative coupling between the optical fiber and the optical element is disrupted. In response to the sensation, the other application of light from the light source may be automatically applied to the optical fiber to rewrite the polymer layer.

The blocks included in the above described process are for illustration purposes. Formation of a communicative coupling between an optical fiber and an optical element using a polymer layer may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a sensor module 526 and a light application module 527 executed on the processor 504 may undertake one or more of the tasks shown in FIG. 7 in response to the instructions 704 conveyed to the processor 504 by the signal bearing medium 702 to perform actions associated with establishing secure communications to manage components of a control system as described herein. Some of those instructions may include, for example, one or more instructions to apply light from a light source to an optical fiber to initiate a photorefractive effect in a polymer layer located between the optical fiber and an optical element, form a path of high refractive index in the polymer layer through the photorefractive effect to provide a communicative coupling between the optical element and the optical element, cause the path of high refractive index to dissipate in the polymer layer by terminating the light from the light source, and re-establish the path of high refractive index in the polymer layer by rewriting the polymer layer through another application of the light from the light source in response to determination that the communicative coupling between the optical fiber and the optical element is disrupted, according to some embodiments described herein.

In some implementations, the signal bearing medium 702 depicted in FIG. 7 may encompass a computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (e.g., a wireless communications medium conforming with the IEEE 802.11 standard).

According to some examples, methods to communicatively couple an optical fiber to an optical element using a polymer layer are provided. An example method may include applying light from a light source to the optical fiber to initiate a photorefractive effect in the polymer layer, where the polymer layer is located between the optical fiber and the optical element. The example method may further include forming a path of high refractive index in the polymer layer through the photorefractive effect, where the path of high refractive index may provide a communicative coupling between the optical element and the optical fiber, the communicative coupling may be an optical coupling facilitating optical communication between the optical fiber and the optical element, and the polymer layer may be photorefractive.

In other examples, the path of high refractive index may be enabled to dissipate by terminating the light from the light source. The path of high refractive index may be re-established through the polymer layer by another application of light from the light source in response to a determination that the communicative coupling between the optical fiber and the optical element is disrupted. A sensor positioned in a connector of the optical fiber may be used to sense that the communicative coupling between the optical fiber and the optical element is disrupted. The path of high refractive index may be re-established by rewriting the polymer through another application of the light from the light source at intervals to provide the communicative coupling between the optical fiber and the optical element. An optical waveguide may be provided as the optical element. Another optical fiber may be provided as the optical element. A light source or a light sensor may be provided as the optical element.

In further examples, a composition of the polymer layer may be selected to achieve a predetermined decay time of the high refractive index path, where the polymer layer may include an elastomer. The polymer layer may comprise a polymer, a photo-refractive additive, an electron trapping agent, and/or a photo-resistive material. The optical fiber, the optical element, and the polymer layer of the polymer may be further coupled through a mechanical connector. The layer of the polymer may be deposited on an optical waveguide in a pattern to match the optical waveguide. Another application of light may be applied from the light source automatically in response to a disruption of the communicative coupling sensed by a sensor positioned in a connector of the optical fiber. A sensor positioned in a connector of the optical fiber may be used to sense the communicative coupling between the optical fiber and the optical element through the polymer layer. The optical fiber may be coupled to another optical fiber through another polymer layer located between an end of the optical fiber and the other optical fiber.

According to some embodiments, apparatuses configured to form an optical coupling between an optical fiber and an optical element may be described. An example apparatus may include a connector configured to mechanically couple the optical fiber and the optical element and a polymer layer supported by the connector and configured to be located between the optical fiber and the optical element when the optical fiber and optical element are mechanically coupled by the connector. The polymer layer may include a photorefractive polymer such that a path of high refractive index is formed in the polymer layer through a photorefractive effect in response to passage of light from a light source through the polymer layer between the optical fiber and the optical element, and the path of high refractive index may communicatively couple the optical element and the optical fiber when the path of high refractive index is formed.

In other embodiments, the polymer layer may comprise a polymer matrix. The photorefractive polymer may comprise an elastomer. The polymer layer may comprise one or more of a photo-refractive additive, an electron trapping agent, and/or a photo-resistive material. The polymer layer may have transient photo-refractive properties and may be deformable. The polymer layer may be patterned to match the optical element. A sensor may be positioned in the connector to detect the coupling of the optical fiber and the optical element. The example apparatus may include a cover adapted to surround the connector to prevent light from external light sources from penetrating the polymer layer and to prevent particulate ingress. The optical fiber may be a single mode fiber or a multimode fiber. The optical fiber may be a flat fiber, a stacked flat pair of fibers, or a cylindrical fiber.

According to some examples, electronic devices capable of optical communication are described. An example electronic device may include a circuit board comprising an optical component and an optical receptacle, and a layer of rewritable photorefractive polymer attached to the optical receptacle. The layer of rewritable photorefractive polymer may be configured such that a path of high refractive index is formed in the layer of the polymer through a photorefractive effect in response to application of light to the layer of the polymer, where the path of high refractive index through the layer of the polymer may provide a communicative coupling to the optical component.

In other examples, a light source may be supported by the circuit board, the light source being configured to apply the light to the layer of the polymer. The optical receptacle may be configured to receive an optical fiber. The layer of the polymer may be configured such that the path of high refractive index through the layer of the polymer is formed when the light is applied through the optical fiber. The layer of the polymer may be deposited on the circuit board by spin coating or drop casting. The path of high refractive index may be re-established in the layer of the polymer by application of the light in response to a determination that the communicative coupling between the optical component and the optical receptacle is disrupted.

In further examples, a sensor may be located proximate the optical receptacle, the sensor being configured to sense the communicative coupling. The sensor may be positioned in a connector of the optical component, and the sensor may be configured to sense when the communicative coupling between the optical component and the optical receptacle is disrupted. The light source may be configured to apply another application of the light at intervals to re-establish the path of high refractive index in the layer of the polymer by rewriting the polymer to provide the communicative coupling between the optical fiber and the optical element.

In some embodiments, a method to communicatively couple an optical fiber to an optical element comprises applying light from a light source to the optical fiber or to an optical element to generate a photorefractive effect in a polymer layer located between the optical fiber and the optical element. The light creates a path of modified (for example, high) refractive index in the polymer layer, the path of modified refractive index allowing a communicative coupling between the optical element and the optical fiber. The communicative coupling may be an optical coupling that facilitates optical communication between the optical fiber and the optical element, for example, a path of higher refractive index passing from an end of an optical fiber to a light receiving (and/or transmitting) surface of an optical element. The polymer layer may be photorefractive, the modified refractive index arising from a photorefractive effect in the polymer. In some embodiments, the light used to form the path may be of the same wavelength used for optical communication, and the intensity of the light may be temporarily increased for path formation. In some examples, a second wavelength, different from that used for optical communication, may be used, for example, visible or UV radiation may be used. In some embodiments, a light source may be configured for path generation (for example, using different wavelength(s) and/or higher power than a light source used for optical communication), and not be intended for optical communication.

In some embodiments, methods and apparatus may include a photorefractive elastomer layer used to provide an optical path between optical elements (wherein each optical element may be selected from: an optical fiber; a light source such as a laser, light emitting diode, and the like; an optical sensor such as a photodiode; a fiber sensor such as a fiber including a strain and/or temperature sensitive portion; a reflector; a lens or other focusing element; a diffractive element; a spectroscopic component such as an analyzer; other optoelectronic or electro-optical component, and the like). Light may self-direct along one or more paths (such as regions) of increased refractive index. In some examples, a path may be formed, decay, and can be rewritten as required. In some examples, the path may be essentially permanent, or re-written at intervals, or as needed, to provide an essentially continuous optically communicative path. In some embodiments, the polymer surface is deformable, and may be resilient, so that the polymer surface conforms with a surface of an adjacent fiber, optical element, or other surface.

In some examples, examples include methods and apparatus for inserting fiber cables and ribbons into a circuit board (including intra or inter-board optical communication), or connecting two fibers together. In some examples, alignment may be achieved between components after manufacture thereof. In some examples, an optical component (such as a fiber) may be manufactured including a polymer layer.

Path formation through the polymer may include application of light, inducing photo-refraction in the polymer. Light may align itself to the path of increased refractive index, and the path may guide light between optical elements, for example between two fiber ends. The polymer may be both an elastic polymer and a photorefractive polymer. The polymer may have transient photorefraction, so that the polymer reverts to its initial refractive index state when light is removed from the material. The path may thereby written and re-written as desired. Another example apparatus is an optically controlled optical router.

In some embodiments, an apparatus configured to form an optical coupling between an optical fiber and an optical element comprises a polymer layer configured to be located between the optical fiber and the optical element when the optical fiber and optical element are mechanically coupled. For example, the apparatus may further include a connector configured to mechanically couple the optical fiber and the optical element, and the connector may further support the polymer layer. In some examples, the connector may include receptacles for each of the optical fiber and the optical element. In some examples, an apparatus may further include a housing, which may be configured to support the polymer layer and/or the connector, and in some examples may further support an optical element to be coupled to a fiber.

In some embodiments, a polymer is deposited on a portion of an optical element or connector therefor. The polymer may be a photorefractive elastomer. A polymer may be deposited using any appropriate method, such as dipping, spray or mist coating, spin-coating, drop casting, or may be pre-formed as a layer, disk, or other desired shape. In some embodiments, the polymer is configured (e.g., patterned) to physically match the optical element or portion thereof, and may provide a coupling area for a fiber optic cable (which may include one or more optical fibers, protective sleeves, and the like), or bare optical fiber(s). An optical fiber may be butt coupled to the optical element through a portion of the polymer. In some embodiments, an apparatus may include an optical element and a connector including an elastomeric photorefractive polymer. In some examples, an apparatus may include an optical element including a light receiving and/or transmitting portion, the portion supporting an elastomeric photorefractive polymer layer. In some examples, an apparatus may include an optical fiber, an optical element, and an interposed connector including an elastomeric photorefractive polymer layer. In some examples, the polymer layer may be a sheet. In some examples, the polymer layer may have one or both surfaces contoured, for example in a complementary form to that of an adjacent fiber or optical element.

Example polymers may comprise thermoplastic polyurethane elastomers, siloxane polymers such as poly(dimethylsiloxane) (PDMS), and the like. A polymer matrix may comprise acrylic polymers, such as poly(acrylic tetraphenyldiaminobiphenol) (PATP), and the like. The photorefractive effect of a polymer layer may include contributions from chemical groups within the polymer, and/or dopants within a polymer matrix. An example photorefractive additive is 4-homopiperidinobenzylidene-malononitrile (7-DCST). Similar groups may be chemically included within the polymer structure, for example as pendant chromophore side-chain groups. An example electron trapping agent may be a coordination complex such as tris(8-hydroxyquinolinato)aluminum ($Alq_3$). In some embodiments, polymers may have one or more (such as all) of the following: photorefractive properties, transport of positive and/or negative charges, trapping of transported charges. In some embodiments, a polymer may show field-induced refractive index modulation. The field may be an optical field, such as the electric field component of optical radiation. Dopants, such as organic dopants, can be mixed or otherwise introduced into a polymer matrix, and monomers including functional groups (such as chromophores) may be polymerized into a photorefractive polymer. In some embodiments, a polymer layer includes a photoresists, and in some examples may be patterned by photolithography. Path rewriting can be done on each connection or periodically to provide regular realignment to enable initial alignment and to enable realignment to avoid loss, for example by mechanical disturbance of optical fibers.

The polymer may have properties which render the photorefractivity transient (for example, through partial charge trapping), the result being that when light is no longer incident on the polymer, the polymer reverts to an essentially uniform refractive index state. In some examples, the polymer may support a mixture of permanent paths and transient reconfigurable paths. The decay time of the photorefractive effect can be adjusted by the formulation of the polymer and dopants (if used), depending on the application. In some examples, the decay time may be selected to be appreciably longer than the time between successive optical pulses for pulsed optical communication. In some examples, a modulated continuous wave optical radiation may be transmitted, and the photorefractive effect may be maintained during a transmission period, even if the photorefractive effect is transient. In some examples, optical radiation may refer to one or more of near-IR, visible, and near-UV electromagnetic radiation, and/or may be laser radiation.

In some embodiments, a connector is configured to sense when a fiber is inserted to the connector, and to provide a signal that may be used to trigger a higher light power for writing (including re-writing) the path.

In some examples, an optical fiber may include one or more, such as a plurality, of individual optical fibers. For example, an optical fiber may be a ribbon cable comprising a plurality of individual optical fibers. The plurality of individual optical fibers may be arranged in any desired configuration, such as stacked flat pairs or in a fiber bundle, such as a generally cylindrical fiber bundle. The fiber ends of a plurality of individual optical fibers may be adjacent a single polymer sheet, for example, a single polymer sheet may span the cross-section of a fiber ribbon or bundle. In some examples, a fiber end may be stripped (cladding is removed) and the stripped fiber end is adjacent the polymer. In other examples, the cladding is retained. In some examples, a plurality of polymer layers may be used in a connector, each polymer layer contacting one or more fibers. A polymer layer may be patterned so that a fiber or group of fibers pressed against it eliminates the air gap between the polymer and adjacent optical components. In some examples, light may be directed into the polymer from both sides, a path being formed between two regions of the polymer exhibiting the photorefractive effect, each region extending from opposite sides of a polymer layer. In some embodiments, light may be provided by a light source associated with the optical element, and/or a light source associated with the optical fiber.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in systems for communicatively coupling an optical fiber to an optical element using a polymer layer. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus configured to form an optical coupling between an optical fiber and an optical element, the apparatus comprising:
   a connector configured to mechanically couple the optical fiber and the optical element;
   a polymer layer supported by the connector and configured to be located between the optical fiber and the optical element when the optical fiber and the optical element are mechanically coupled by the connector,
      wherein the polymer layer includes an elastomeric photorefractive polymer with transient photo-refractive properties such that a path of high refractive index is formed in the polymer layer through a photorefractive effect in response to passage of light from a light source through the polymer layer between the optical fiber and the optical element and the path of high refractive index is dissipated in the polymer layer in response to termination of the light from the light source, and wherein the path of high refractive index communicatively couples the optical element and the optical fiber when the path of high refractive index is formed: and a sensor positioned in the connector of the optical fiber and configured to detect the communicative coupling between the optical element and the optical fiber, wherein in response to a determination, by the sensor, that the communicative coupling between the optical element and the optical fiber is disrupted, the path of high refractive index is re-established by rewriting the polymer layer through another application of the light from the light source.

2. The apparatus of claim 1, wherein the polymer layer further comprises a polymer matrix.

3. The apparatus of claim 1, wherein the polymer layer comprises one or more of a photo-refractive additive, an electron trapping agent, and a photo-resistive material.

4. The apparatus of claim 1, wherein the polymer layer is deformable.

5. The apparatus of claim 1, wherein the polymer layer is patterned to match the optical element.

6. The apparatus of claim 1, further comprising:
a cover adapted to surround the connector to prevent light from external light sources from penetrating the polymer layer and to prevent particulate ingress.

7. The apparatus of claim 1, wherein the optical fiber is one of a single mode fiber and a multimode fiber.

8. The apparatus of claim 1, wherein the optical fiber is one of a flat fiber, a stacked flat pair of fibers, and a cylindrical fiber.

* * * * *

UNITED STATES PATENT AND TRADEMARK OFFICE
CERTIFICATE OF CORRECTION

PATENT NO. : 9,746,622 B2
APPLICATION NO. : 14/778601
DATED : August 29, 2017
INVENTOR(S) : Ladouceur et al.

It is certified that error appears in the above-identified patent and that said Letters Patent is hereby corrected as shown below:

On the Title Page

In Item (72), under "Inventors", in Column 1, Line 1, delete "Waterloo (CA);" and insert -- Waterloo (AU); --, therefor.

In the Claims

In Column 21, Line 11, in Claim 1, delete "formed: and" and insert -- formed; and --, therefor.

In Column 22, Line 17, in Claim 8, delete "fiat" and insert -- flat --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*